United States Patent [19]

Pfabe et al.

[11] Patent Number: 4,928,130
[45] Date of Patent: May 22, 1990

[54] STAGGERED ARRANGEMENT FOR IMPROVING RADAR REFLECTION

[75] Inventors: Peter Pfabe; Hubert Nöhren, both of Hamburg, Fed. Rep. of Germany

[73] Assignee: Autoflug GmbH, Rellingen, Fed. Rep. of Germany

[21] Appl. No.: 368,895

[22] Filed: Jun. 14, 1989

Related U.S. Application Data

[63] Continuation of Ser. No. 781,114, Sep. 27, 1985, abandoned.

[30] Foreign Application Priority Data

Oct. 2, 1984 [DE] Fed. Rep. of Germany ....... 3436063

[51] Int. Cl.⁵ ................................................. F41J 9/10
[52] U.S. Cl. ............................................. 342/9; 342/5
[58] Field of Search .................... 342/1, 4, 5, 7, 9, 10, 342/424, 492, 446

[56] References Cited

U.S. PATENT DOCUMENTS

| | | | |
|---|---|---|---|
| 2,985,880 | 5/1961 | McMillan | 342/4 |
| 3,047,860 | 7/1962 | Swallow et al. | 342/9 |
| 3,354,458 | 11/1967 | Rottmayer | 342/10 |
| 3,427,619 | 2/1969 | Wesch et al. | 342/4 |
| 3,568,192 | 3/1971 | Dawson | 342/5 |
| 4,449,192 | 5/1984 | Watanabe et al. | 342/446 |
| 4,540,987 | 9/1985 | Werkes et al. | 342/10 |

OTHER PUBLICATIONS

Merrill I. Skolnik, Introduction to Radar Systems, 2nd Edition, 1980, pp. 331–332.

Primary Examiner—Thomas H. Tarcza
Assistant Examiner—Mark Hellner
Attorney, Agent, or Firm—Robert W. Becker & Associates

[57] ABSTRACT

In a staggered arrangement of individual elements that are made of conductive material and are spaced from one another, and which serve to improve the reflectivity of objects which are to be detected by radar with a search frequency band, there exists the problem that due to the insufficient dimensioning of the spacing of the individual elements, and the thus caused passage of radar beams or the only point-like reflection, an insufficient reflectivity of the object is provided. To resolve this problem, the individual elements are spaced from one another starting at one half of the wavelength corresponding to the lower cutoff frequency of the selected frequency band, and increasing, pursuant to a geometric progression, to one half of the wavelength corresponding to the upper cutoff frequency of the frequency band.

20 Claims, 6 Drawing Sheets

STAGGERED ARRANGEMENT FOR IMPROVING RADAR REFLECTION

This application is a continuation of copending parent application Ser. No. 781,114—Pfabe et al filed Sept. 27, 1985, belonging to the assignee of the present invention and now abandoned.

BACKGROUND OF THE INVENTION

1. Field of the Invention

The present invention relates to a staggered arrangement of individual elements that are made of conductive material and are spaced from one another; these individual elements are disposed on an object which is to be detected by radar, and in particular radar having either an individual search frequency or a search frequency band. The present invention also relates to the use of staggered and/or lattice-like arrangements.

2. Description of the Prior Art

When detecting objects with radar, in many applications there is the need to detect objects of non-conductive materials in the water, on land, and in the air. Examples of such objects include all types of aerial targets, as well as parachutes, aircraft, liferafts, and dummy targets. In this connection, it is known to load the appropriate objects with electrically or galvanically conducting coatings, to chemically undertake coating of the objects with metallic coatings, as well as to dispose threads of a conductive material in the base fabric of objects comprised of fabric.

However, these measures have the drawback that an insufficient reflection of the transmitted radar beams is achieved, either because coated objects act as surfaces for the high frequency radar beams, and consequently the beams emitted by the transmitter are not reflected to the receiver, rather are deflected in conformity with the ratio of the angle of incidence and angle of reflection, or because fabrics provided with conductive threads to a large extent allow the beams to pass through due to the insufficient dimensioning of the spacing of the threads, or only reflect the beams in the region of individual threads, with the individual threads, as individual elements, acting as a panoramic display for the reflection. It is also known, for improving the reflectivity of objects, to attach to the objects additional components, approximately in the form of so-called mechanical or corner reflectors. However, this has the drawback that the space required for accommodating an additional component on or in the object which is to be detected by radar is not always available, and that mechanical reflectors attached to the object alter the outer contour of the object.

An object of the present invention is to improve the reflection of objects which are to be detected in water, on land, and in the air, especially objects of electrically or galvanically non-conductive material, and to do so without altering the contour of the object itself.

It is a further object of the present invention to present applications for the aforementioned staggered arrangements.

BRIEF DESCRIPTION OF THE DRAWINGS

These objects and other objects and advantages of the present invention, will appear more clearly from the following specification in conjunction with the accompanying drawings, in which.

SUMMARY OF THE INVENTION

Figure 1A:
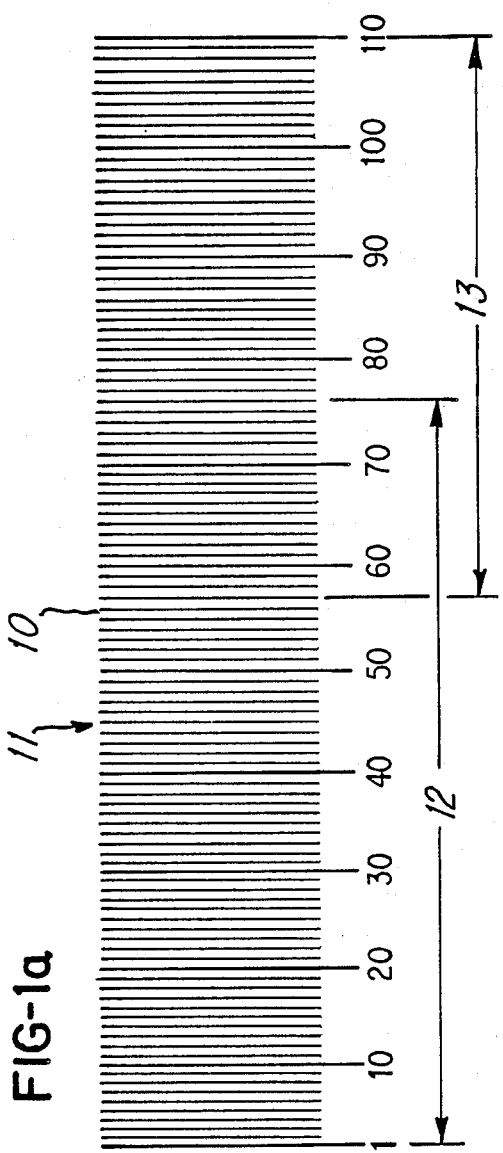
FIGS. 1a and 1b are views that schematically illustrate a staggered arrangement of conductive individual elements for a frequency band.

The staggered arrangement of the present invention may be characterized in that the electrically or galvanically conductive individual elements are spaced on a carrier at distances corresponding to one half of the wavelength fixed by the search frequency. The spacing of the individual elements may be an integral multiple of this half wavelength.

The staggered arrangement of the present invention may also be characterized in that the distance between individual ones of the individual elements starts at one half of the wavelength of the lower cutoff frequency of the selected frequency band, and decreases, pursuant to a geometric progression, to one half of the wavelength of the upper cutoff frequency of the frequency band.

Pursuant to further advantageous features of the present invention, in order to shift the geometric spacing progression, the limiting wavelengths may be an integral multiple of the half wavelength fixed by the respective cutoff frequencies of the frequency band. At least two frequency bands may be grouped together to form an arrangement for an object, with the computation of the spacing of the individual elements being based upon an integral multiple of the longest and shortest wavelengths of a given one of the frequency bands.

In order to improve the reflectivity of the object when the beams strike at an angle, thus involving an aspect angle, further individual elements may be provided which are spaced from one another at a distance greater than the distance corresponding to the lower cutoff frequency of the frequency band. Relative to the frequency band provided for the computation, a lower cutoff frequency may be established for the spacing computation, with this lower cutoff frequency corresponding to the limiting aspect angle that is to be detected.

The individual elements may have the same polarization, namely may be disposed essentially parallel to one another. At least two arrangements of equally polarized individual elements may be provided, with the individual elements of a given one of the arrangements crossing the individual elements of another one of the arrangements. These individual elements may cross one another at an angle of 90°.

The individual elements may be disposed on an object in such a way as to encircle the latter, and the individual elements may have a thread-like configuration. The object may form a direct carrier for the individual elements, or a separate carrier may be provided for the individual elements, with the carrier being in the form of a non-conductive base fabric which is secured to the object.

By way of example only, the object in which the inventive reflective arrangement is disposed may be an aerial target, an air-towed military target, a towed flag, a towed arrow-like member, a parachute canopy, a liferaft, or a mechanical or corner reflector.

The present invention first of all has the advantage that an additive amplification of the reflection takes place with an individual radar search frequency due to a spacing which equates to half of the wavelength of the respective frequency. This amplification occurs because the reflection from the individual elements is effected in the same direction. In this connection, the additive amplification of the reflection is proportional to the number of individual elements.

Since the search frequency of a radar unit generally does not comprise a single frequency, but rather comprises a specific frequency band, it is proposed pursuant to one advantageous embodiment of the present invention to increase the spacing of the individual elements relative to one another pursuant to a geometric progression, in particular starting from the half wavelength corresponding to the lower cutoff frequency of the frequency band, and increasing to the half wavelength which corresponds to the upper cutoff frequency of the frequency band. This feature also assures that each individual frequency within the search frequency band corresponds to an appropriate spacing of the adjacent conductive individual elements, which viewed as a whole leads to an overall amplification of the radar reflection.

It is furthermore advantageously possible, by selecting a lower cutoff frequency, to also achieve a uniformly good reflection when the aspect angle changes. In addition, by stacking a number of search frequency bands within one another, it is possible to significantly improve the utility of the objects with regard to detection by various radar units.

The lattice-like arrangement of the individual threads can be disposed directly on the object as a carrier by disposing the individual threads upon the surface of the object itself. However, pursuant to a preferred embodiment of the present invention, the lattice-like arrangement is worked into a carrier-like base fabric, so that the thus resulting radar reflecting fabric can be placed upon the surface of the object, or the object itself can be produced directly from the appropriate fabric.

Particular applications of the inventive staggered arrangement include aerial targets of all types, in particular towed aerial targets, towed flags, towed arrow-like members, parachutes, liferafts, and so-called corner reflectors, just to name a few. However, the present invention is not limited to these named applications, but rather extends in principle to all two or three dimensional bodies where the radar reflection is to be improved, and on which staggered individual elements of conductive material can be disposed.

Since with regard to a good reflection, the polarization of the transmitter must be identical to the polarization of the individual elements, which means that; with a vertical polarization of the high frequency beams, the conductive individual elements must also be disposed vertically; a particularly advantageous embodiment results when, especially with regard to the previously named applications, where due to the movements of the object horizontal and/or vertical or intermediate orientations of the individual elements can also occur; at least two respectively identically polarized arrangements of elements cross one another in a lattice-like arrangement.

In this manner, one can be advantageously assured that when the object moves, the polarizations of conductive elements and the transmitter repeatedly and periodically coincide.

Prior to considering the illustrated embodiments in detail, the basis for the inventive design will first be explained.

The starting point is a woven-like arrangement where the individual conductive elements are disposed at a distance from one another corresponding to half of the wavelength of the search frequency. As already indicated, with such an arrangement there is effected an additive amplification of the reflection as a function of the number of individual elements, with this number, in turn, being a function of the length of the object which is to be detected. In this connection, it can be expedient to be able in general to increase the spacing by providing an integral multiple of the respective wavelengths, especially in order to be able to get from otherwise very small distances between individual conductive elements, which can only be technically achieved at great expense, to greater spacings which are easier to realize.

A further application relates to the use of at least one frequency band to locate the object, and also relates to the improvement of the reflection characteristic connected therewith. An example of this is the so-called X-band with an upper cutoff frequency of 9.6 gigahertz and a lower cutoff frequency of 8.5 gigahertz, corresponding to an upper wavelength of 3.172 centimeters and a lower wavelength of 3.531 centimeters. The first step for computing the geometric spacing progression is to initially determine the number of required individual elements as a function of the two cutoff frequencies, i.e. their corresponding wavelengths. For this purpose, the quotient of two logarithms are to be added to the number 2. The dividend of this quotient is the logarithm of the ratio of the lower wavelength to the upper wavelength, and the divisor is the logarithm of the value given by the mathematical ratio of the overall length of the object, less half of the upper wavelength, to the overall length, less half of the lower wavelength.

The distance of the respective ith individual element within a given geometric spacing progression of the previously calculated total number of individual elements is then provided by multiplication of half of the upper wavelength by a value resulting from raising the mathematical ratio of the lower wavelength to the upper wavelength, as the base, to a power determined by the quotient of the position number of the searched individual element, reduced by the number 1, and the total number of individual elements, also reduced by the number 1. The wavelength of a specific ith individual element within the geometric progression then corresponds to twice the distance computed for the pertaining individual element.

As a result of the above described computing base, the appropriate distances for all of the individual elements within the calculated total number can be tabulated, and in particular until the fixed total number of individual elements is obtained, which is limited by the overall length of the object.

A problem which occurs in particular when the radar transmitter and the object move relative to one another, is that due to the aspect angle which occurs between the axis of the object and the transmitter, and which is constantly changing, the travel times of the emitted beams to the individual elements disposed on the object change; for example, as the aspect angle increases, the travel times decrease. The result is that the additive amplification of the reflection achieved with the present invention is adversely affected. In order to remedy this situation, it is proposed pursuant to a further feature of the invention to annex adjacent to a region of individual elements computed for a given frequency band a further region of individual elements, the spacing of which is increased by the cosine of the respective aspect angle, so that the reduction of the travel time of the beams is compensated for by a corresponding increase of the spacing.

The provision of individual elements required for the aspect angle is expediently taken into account in that the lower frequency, which corresponds to a specific limiting aspect angle, is used in the computation as the lower, assumed cutoff frequency of the frequency band selected for the computation, whereby, however, the process of the calculation as such, as previously described, remains unchanged.

Since frequently a detection of the objects involves not only one but two or more search frequency bands, it is proposed pursuant to a further feature of the present invention, relative to at least two frequency bands, to stack within one another the calculated distances of the individual elements, which distances or spacings respectively increase pursuant to the pattern of an individual geometric progression, so that there is provided on one and the same overall length of the object spacing regions of the individual elements pertaining to at least two frequency bands. The important thing is an appropriate selection of an integral multiple of the half wavelengths of the respectively used upper cutoff frequency and lower cutoff frequency of the pertaining frequency band, which is then used in the previously described calculation of the distances.

DESCRIPTION OF PREFERRED EMBODIMENTS

Figure 1B:
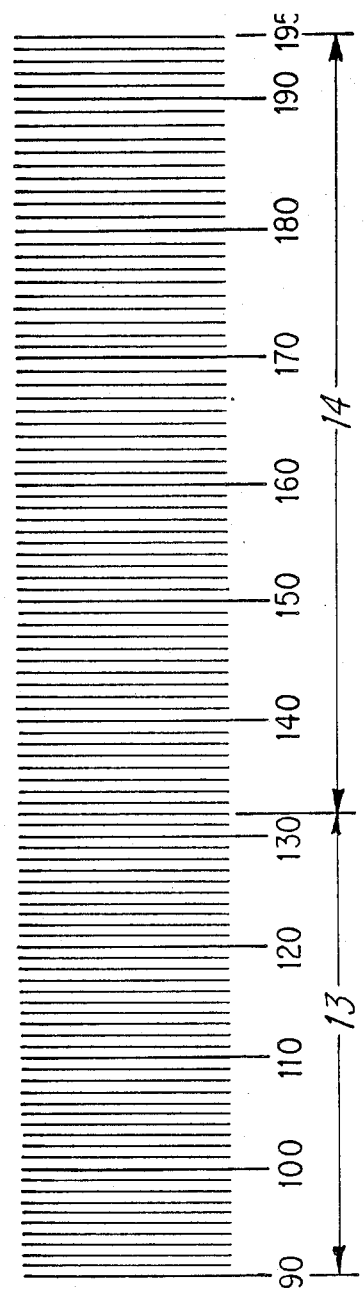

Referring now to the drawings in detail, one example in which all of the previously explained embodiments of the present invention can be understood, is shown in FIG. 1, which for ease of illustration is divided into the overlapping FIGS. 1a and 1b. The basis for this exemplary embodiment is 195 individual elements 10 on an object 11 in the form of an air-towed combat target having an overall length of 360 centimeters. Initially provided is the so-called X-band with an upper cutoff frequency of 9.6 gigahertz and a lower cutoff frequency of 8.5 gigahertz, with corresponding wavelengths of 3.172 and 3.531 centimeters. In order to have sufficient reserve for improving the radar reflection even when the aspect angle increases, a considerably lower cutoff frequency of only 7 gigahertz, corresponding to a wavelength of 4.3 centimeters, was used in the calculation as the assumed lower cutoff frequency. In conformity with the previously described computation base, there resulted after iteration a total number of 195 individual elements 10 for the 360 centimeter long towed target, starting with the spacing of 1.586 centimeters for the first two elements 10, which spacing corresponds to half of the upper wavelength of the X-band. The last two of the 195 individual elements 10 have a spacing of 2.15 centimeters, which corresponds to half of the wavelength of the assumed lower cutoff frequency. The actual X-band is indicated by the region 12, and includes only the region to a spacing of 1.76 centimeters, which corresponds to half of the wavelength of the actual lower cutoff frequency of 8.5 gigahertz of the X-band. This spacing is obtained at the 76th individual element 10.

A further frequency band covers the so-called KU-band, which has an upper cutoff frequency of 17.5 gigahertz and a lower cutoff frequency of 15.5 gigahertz. The corresponding wavelengths of 1.741 centimeters and 1.935 centimeters, of which respectively only half is used for the calculation, means that the corresponding individual elements 10 having a spacing of less than one centimeter would not be integrated in the region 12 for the X-band, since the latter starts with the spacing of 1.586 centimeters. The remedy for this is the use in this case of a double value for the half wavelengths of the KU-band, so that there results a region 13 for the KU-band from the 57th element, with the spacing of 1.41 centimeters, to the 132nd individual element, with a spacing of 1.935 centimeters.

The remaining 63 individual elements (as previously mentioned this embodiment has a total of 195 individual elements) form in the region 14 the reserve for the aspect angle which occurs. In particular due to the provision of respective integral multiples of the pertaining wavelengths, there can in general be undertaken a shifting of the spacing regions, especially from very small distances of the individual elements 10, which is technically very expensive to provide, to greater distances which are much easier to realize.

Figure 2:
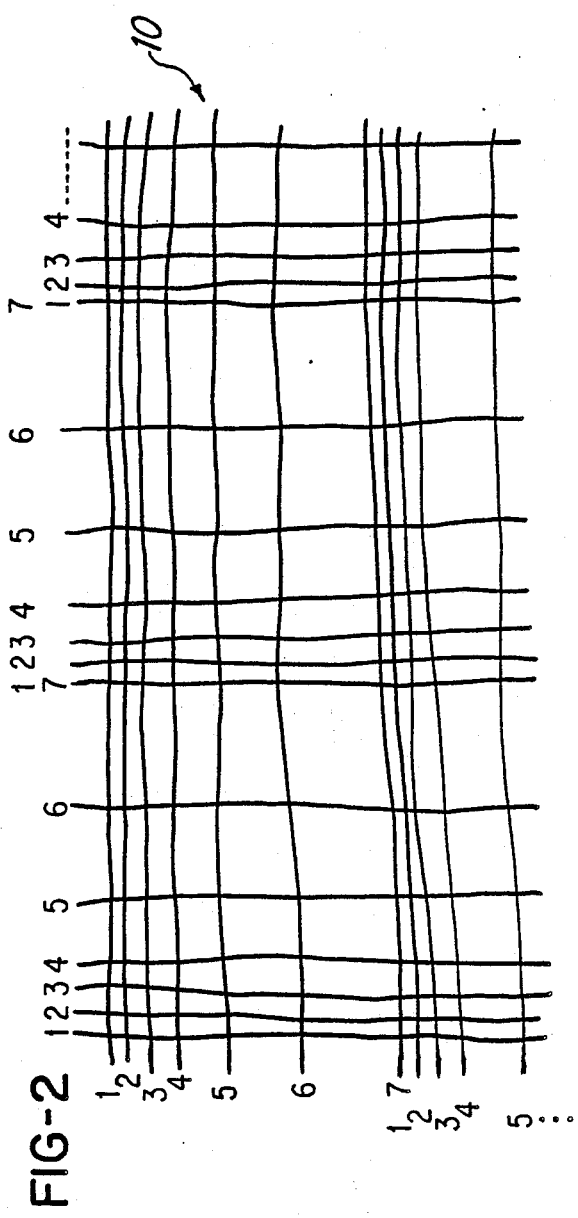
FIG. 2 is a view of two net-like arrangements which cross one another in a lattice-like manner.

As shown in FIG. 2, the individual elements 10 can also be disposed in a lattice-like arrangement, crossing each other at right angles. The numerals 1 to 7 designate individual elements which respectively belong to a given frequency band. The distance between individual elements increases in a geometric progression, as clearly shown. The numeral 1 of a given frequency band designates the individual element for the upper cutoff frequency, and the numeral 7 designates the individual element for the lower cutoff frequency.

Figure 3:
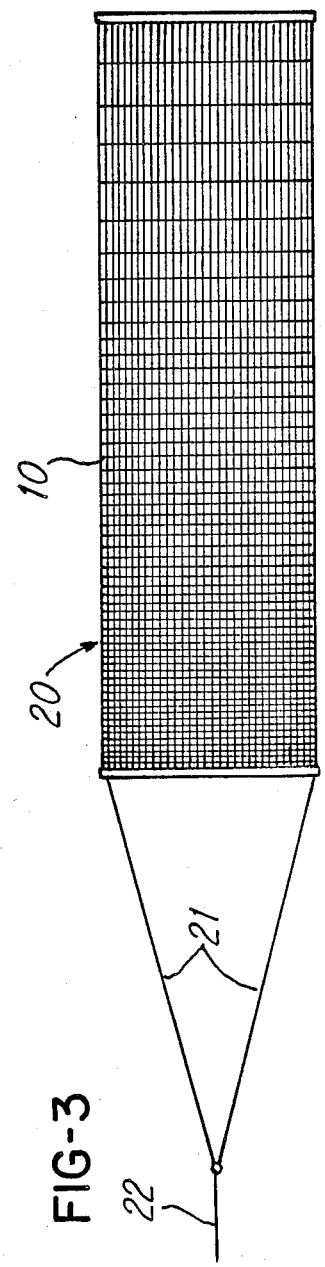
FIG. 3 is a view that illustrates the use of the lattice-like arrangement with a towed flag.

The remaining figures illustrate exemplary embodiments for the use of the web-like individual elements 10. For example, FIG. 3 illustrates a towed flag 20, with the individual elements 10 being disposed with respect to the radar detection for a given frequency band. The towed flag 20 is pulled by means of two lines 21 which come together in a point, and a towing line 22 which is connected thereto and to a non-illustrated aircraft.

Figure 4:
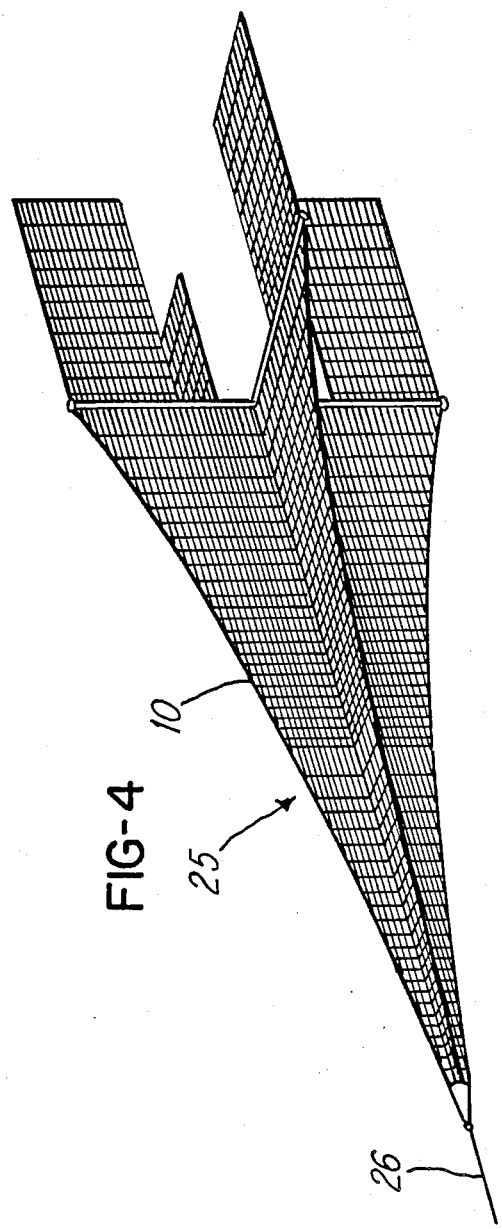
FIG. 4 is a view that illustrates the use of the lattice-like arrangement with a towed arrow-like member.

A similar arrangement of the individual elements 10 is provided in the illustration of FIG. 4, which shows a towed arrow-like member 25 which is pulled by a towing line 26.

Figure 5:
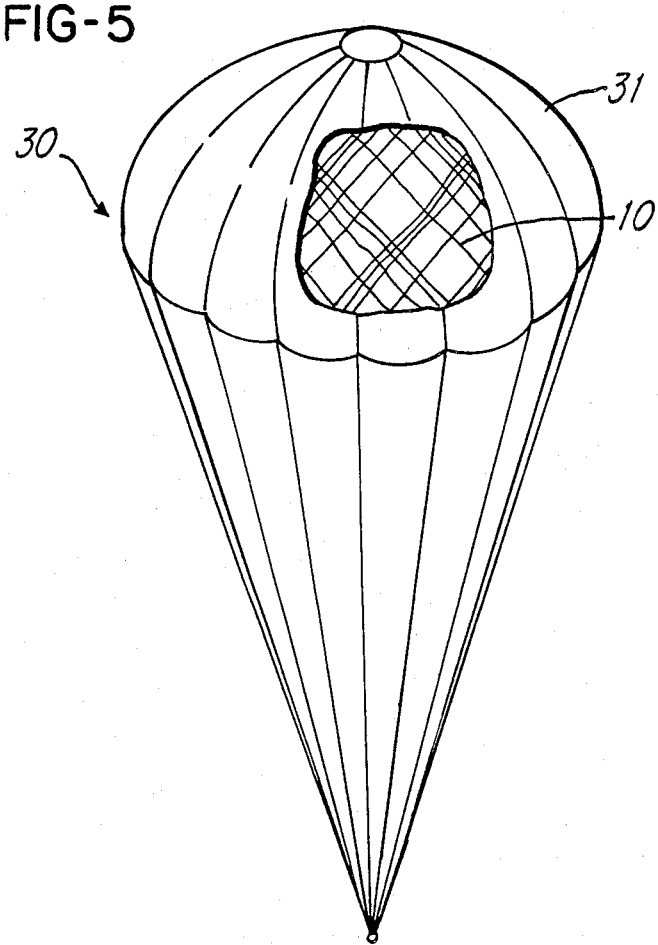
FIG. 5 is a view that shows the use of the web-like arrangement in a parachute.

A parachute 30 is illustrated in FIG. 5, with a cut-away portion clearly showing the arrangement of the individual elements 10 in the region of the material of the parachute canopy 31. Due to the uncertain search direction of the radar, a lattice-like arrangement of the individual elements 10 similar to that shown in FIG. 2 is used.

Figure 6:
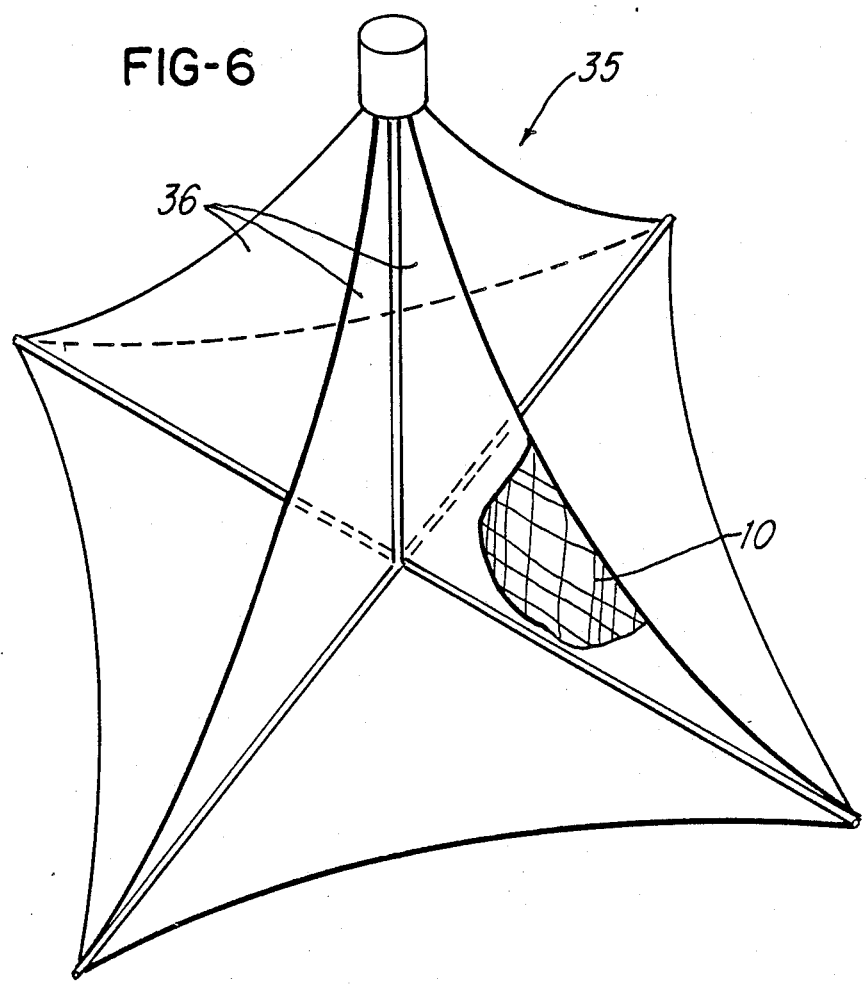
FIG. 6 is a view that shows the use of the web-like arrangement in a mechanical or corner reflector.

The problem existing with the mechanical or corner reflector 35 illustrated in FIG. 6 is that upon irradiation in the longitudinal direction of the walls 36, no reflection, or only a very slight reflection, occurs, whereas when the beams strike in the middle region of the opening of the device 35, an absolute maximum of reflection is noted. By disposing the inventively stacked lattice structure of the individual elements 10 in the walls 36, the reflection is significantly improved in this region.

Figure 7:
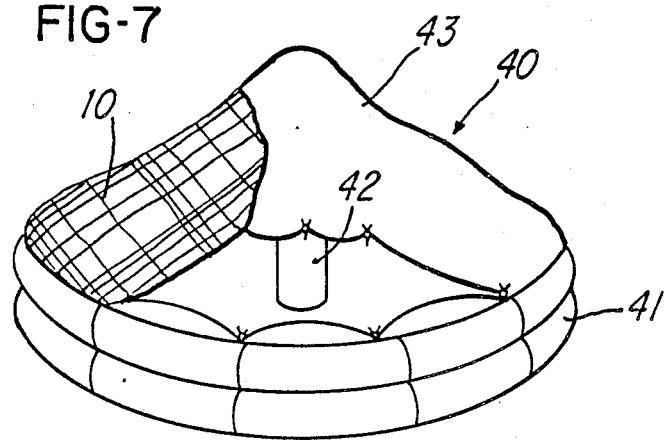
FIG. 7 is a view that shows the use of the web-like arrangement in a liferaft.

A further possible application of the present invention for radar reflection in a water environment is shown in FIG. 7, which schematically illustrates a liferaft 40 having a raft body 41, a roof support 42, and a tent-like roof 43 which is closed on all sides. With this application possibility also, the reflection of the life raft 40 is significantly improved by the installation of a lattice structure of individual elements 10 in the fabric of the roof 43.

The present invention is, of course, in no way restricted to the specific disclosure of the specification and drawings, but also encompasses any modifications within the scope of the appended claims.

What we claim is:

1. In a staggered arrangement including towed aerial targets and multi-dimensional bodies where radar reflection is to be improved and on which staggered individual elements can be disposed that are made of conductive material and are spaced from one another; said elements being staggered for better radar reflection in a range between a lower cutoff frequency of a selected frequency band and an upper cutoff frequency of said selected frequency band having a predetermined wavelength of lower and upper cutoff frequencies respectively and being disposed on an object which is to be detected by a search frequency band of a radar unit;

the improvement in combination therewith comprising selecting said selected frequency band based upon a mathematically regulated variable spacing between said staggered individual elements ranging from a maximum spacing to a minimum spacing rather than constant spacing, said mathematically regulated variable spacing being based on a predetermined geometric progression involving said spacing between said staggered individual elements and said wavelength of said upper and lower cutoff frequencies of said selected frequency band wherein the distance between individual ones of said staggered individual elements at said maximum spacing starts at one half of the wavelength of the lower cutoff frequency and decreases in accordance with said predetermined geometric progression to one half of the wavelength of said upper cutoff frequency so that automatic gain of reflection results in said search frequency band of the radar unit which as a whole leads to an overall additive amplification of radar reflection according to mathematical regulation.

2. An arrangement in combination according to claim 1, in which, in order to shift the geometric spacing progression, the limiting wavelengths are an integral multiple of the half wavelength fixed by the respective cutoff frequencies of said frequency band.

3. An arrangement in combination according to claim 1, which includes at least two frequency bands grouped together to form an arrangement for an object, with the computation of the spacing of the individual elements being based upon an integral multiple of the longest and shortest wavelengths of a given one of said frequency bands.

4. An arrangement in combination according to claim 1, which, in order to improve the reflectivity of said object when the beams strike at an angle, thus involving an aspect angle, further individual elements are provided which are spaced from one another at a distance greater than the distance corresponding to the lower cutoff frequency of said frequency band.

5. An arrangement in combination according to claim 4, in which, relative to the frequency band provided for the computation, a lower cutoff frequency is established for the spacing computation, said lower cutoff frequency corresponding to the limiting aspect angle that is to be detected.

6. An arrangement in combination according to claim 1, in which said individual elements have the same polarization, namely are disposed essentially parallel to one another.

7. An arrangement in combination according to claim 1, which includes at least two arrangements of equally polarized individual elements, with the individual elements of a given one of said arrangements crossing the individual elements of another one of said arrangements.

8. An arrangement in combination according to claim 7, in which said individual elements cross one another at 90°.

9. An arrangement in combination according to claim 1, in which said individual elements are disposed on an object so as to encircle the latter.

10. An arrangement in combination according to claim 1, in which said individual elements have a thread-like configuration.

11. An arrangement in combination according to claim 1, in which said object forms a direct carrier for said individual elements.

12. An arrangement in combination according to claim 1, which includes a carrier for said individual elements, said carrier being in the form of a non-conductive base fabric which is secured to said object.

13. An arrangement in combination according to claim 1, in which said object is in the form of an aerial target.

14. An arrangement in combination according to claim 1, in which said object is in the form of an air-towed military target.

15. An arrangement in combination according to claim 1, in which said object is in the form of a towed flag.

16. An arrangement in combination according to claim 1, in which said object is in the form of a towed arrow-like member.

17. An arrangement in combination according to claim 1, in which said object is in the form of a parachute canopy.

18. An arrangement in combination according to claim 1, in which said object is in the form of a liferaft.

19. An arrangement in combination according to claim 1, in which said object is in the form of a mechanical or corner reflector.

20. An arrangement in combination according to claim 1, in which said additive amplification of the radar reflection takes place with a predetermined radar search frequency band due to a spacing that equates to half of the wavelength of the respective frequency and also said additive amplification of the radar reflection as a function of the number of individual elements is proportional to the number of individual elements from which the reflection is effected in the same direction and being a function of the length of the object being detected, each individual frequency within the search frequency band corresponding to an appropriate spacing of the adjacent conductive elements, which viewed as a whole, leads to an overall amplification of the radar reflection.

* * * * *